US005984291A

United States Patent [19]
Iwata et al.

[11] Patent Number: 5,984,291
[45] Date of Patent: *Nov. 16, 1999

[54] MOUNTING SUPPORT DEVICE

[75] Inventors: Kazuhide Iwata; Toshiya Sato, both of Gifu, Japan

[73] Assignee: Kabushiki Kaisha Imao Corporation, Japan

[ * ] Notice: This patent is subject to a terminal disclaimer.

[21] Appl. No.: 09/019,758

[22] Filed: Feb. 6, 1998

Related U.S. Application Data

[63] Continuation of application No. 08/517,950, Aug. 22, 1995, Pat. No. 5,716,043.

[30] Foreign Application Priority Data

Oct. 24, 1994 [JP] Japan .................................... 6-284266

[51] Int. Cl.$^{6}$ ...................................................... B23Q 1/04

[52] U.S. Cl. ................................ 269/73; 269/71; 269/99; 269/100; 269/900

[58] Field of Search ................................. 269/45, 55, 71, 269/73, 76, 82, 88, 91, 92, 93, 99, 100, 101, 329, 900

[56] References Cited

U.S. PATENT DOCUMENTS

| | | | |
|---|---|---|---|
| 2,195,277 | 3/1940 | Kleinman | 269/281 |
| 2,928,320 | 3/1960 | Stokey | 269/93 |
| 3,608,886 | 9/1971 | Greene | 269/307 |
| 4,013,280 | 3/1977 | Chitayat et al. | 269/71 |
| 4,794,687 | 1/1989 | Peters et al. | 269/900 |
| 4,822,014 | 4/1989 | Buchler | 269/71 |
| 4,892,283 | 1/1990 | Cutburth | 269/73 |
| 5,019,129 | 5/1991 | Johanson | 269/71 |
| 5,026,033 | 6/1991 | Roxy | 269/45 |
| 5,056,766 | 10/1991 | Engibarov | 269/101 |
| 5,060,920 | 10/1991 | Engibarov | 269/282 |
| 5,547,330 | 8/1996 | Walimaa et al. | 269/71 |

FOREIGN PATENT DOCUMENTS

| | | |
|---|---|---|
| 0116260 | 12/1983 | European Pat. Off. . |
| 0149429 | 12/1984 | European Pat. Off. . |
| WO94/01242 | 7/1993 | WIPO . |

*Primary Examiner*—Robert C. Watson
*Attorney, Agent, or Firm*—Morrison Law Firm

[57] ABSTRACT

A mounting support device allows workpieces to be attached at points intermediate between discrete positions of fixture bases of machine tools. The mounting support device has three support members. A lower support member is slidably attached to an intermediate member allowing the intermediate member to move along an x-axis. An upper support member is slidably attached to the intermediate member allowing the upper member to move along a z-axis. A jig for holding a workpiece is connected to the upper member. The lower support member is attached to the fixture base in a discrete location in the usual way. Thus, the jig holding the workpiece can be positioned intermediately between discrete mounting positions of the fixture base. The sliding attachments maintain precise alignment between the support members and can be secured after adjustment.

9 Claims, 13 Drawing Sheets

20
44
44
42
28
27
42
18a
B2
L3
19
19a
19
16a
L2
L1
19a
18c
18c
18b
18
16
16c
B1

50

20
D2
23
18a
M3
23
23a
23a
20a
26
20a
M2
20b
25
M1
16a
38
40
18b
40
38
16
18
D1
16c

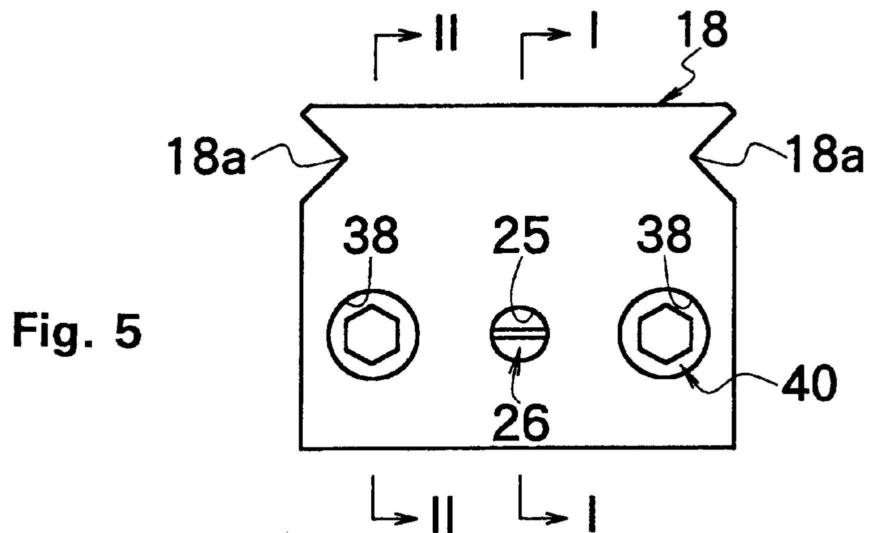
Fig. 5
Fig. 6
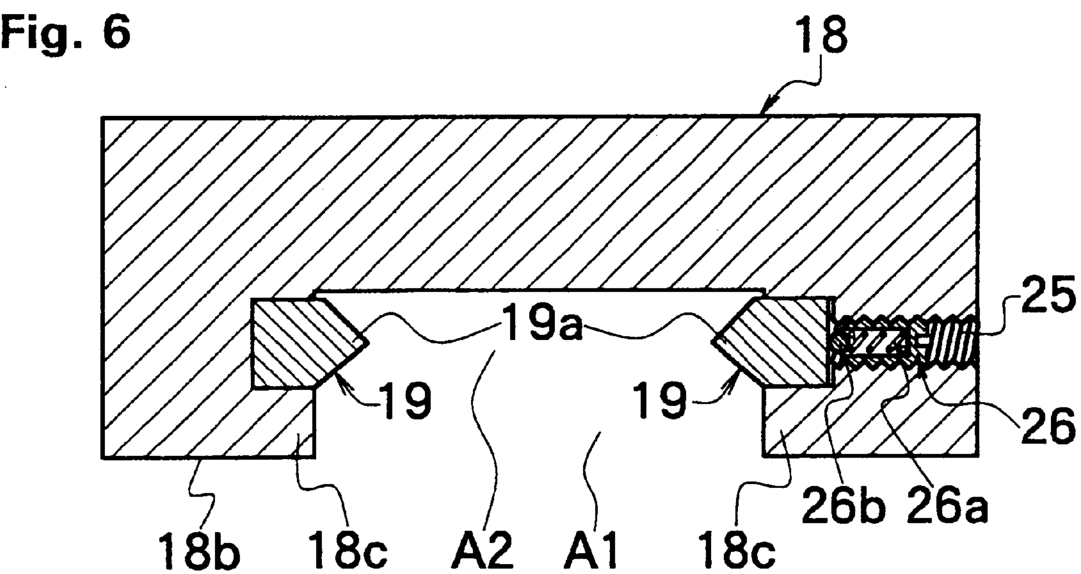

T10
T5
T6
T11
T3
T4
T9
T1
Ta1
T8
T2
S0
T7
T12
58
57a
46
52
20
57
54
50
57b
56
44
S1
27
18
26
40
16
T13

13
20
10
16
18
BP1
18
20
16
BP2
20
16
18
TL1

20
18X
18
16
16X
12

MOUNTING SUPPORT DEVICE

This is a continuation of pending application Ser. No. 08/517,950, filed Aug. 22, 1995, now U.S. Pat. No. 5,716, 043.

BACKGROUND

This invention relates to a mounting support device to be fixed to a fixture base having at least one reference hole or one reference channel.

In a normal machining operation, a jig or a mounting support is mounted on a fixture base, such as a machine table or a pallet, to hold a workpiece for processing (jig is defined as any type of fixture that can be used to hold or position the workpiece on a base). The workpiece is fixed in a predetermined position on the fixture base using jigs or mounting supports that are mounted on the fixture base. There are many types of mounting support types including tightening members such as clampers, fixing members such as stoppers and positioning members such as positioning pins.

Referring to FIG. 21, a prior-art fixture base R1 includes reference holes K1 for fixing and positioning a displacement element (not shown) on fixture base R1. Reference holes K1 are disposed apart in an array at predetermined intervals of, for example, 50 mm longitudinally and laterally. Thus, to fix the aforementioned tightening member, fixing member, or positioning member in a position between a pair of reference holes K1 and K1, (ie. a position in which no reference hole exits) a positioning support member P1 is affixed on fixture base R1.

The positioning support member P1 includes a plate member having a U-shaped slot P2 at one end and a mounting hole P3 at the other end. The positioning support member P1 is bolted to fixture base R1 by a bolt Y1 inserted through elongated hole P2 and tightened in one of reference holes K1. The mounting hole P3 can be positioned at a predetermined position between the reference holes K1 and K1 by fine-adjusting the tightening position of the bolt Y1 along U-shaped slot P2 and by pivoting the positioning support member P1 about the bolt Y1 on fixture base R1. The ability to position mounting hole P3 substantially anywhere over the surface of fixture base R1 thus permits affixing a tightening member in any desired location, even where no reference hole K1 exists.

However, it is difficult to separately determine the position of the mounting hole P3 with respect to the X-axis and Z-axis, indicated by arrows X and Z respectively, on fixture base R1 because the position of the mounting hole P3 is determined both by pivoting and displacing the positioning support member P1 with respect to bolt Y1. Thus, in normal operation, the position of mounting hole P3 with respect to the X-axis and Z-axis is determined at a roughly specified location depending on a user's experienced sense. Additionally, if the positioning support member P1 is removed from fixture base R1, it is very difficult to re-fix the positioning support member P1 on fixture base R1 at the exact former position.

PCT International Publication No. W094/01242 discloses an adapter for use with clamping devices on multi-hole machine-tool workpiece tables. This adapter comprises a base plate, a transverse displacement element providing transverse displaceability on the base plate, a longitudinal displacement element providing longitudinal displaceability on the transverse displacement element, a cylindrical bolt body whose upper portion is threaded, and a lock nut which can be tightened and fastened to the cylindrical bolt body from above. The user appropriately moves the transverse displacement element transversely on the base plate and then moves the longitudinal displacement element on the transverse displacement element longitudinally. The user then tightens the aforementioned lock nut to the threaded portion of the bolt body from above in order to fix the longitudinal displacement element and the transverse displacement element to the base plate.

In this construction, both the transverse displacement element and the longitudinal displacement element are fastened to the base plate only by tightening the lock nut on the threads of the bolt. Therefore, if the transverse displacement element or the longitudinal displacement element receives a force acting in the transverse or longitudinal direction, the element is likely to move transversely or longitudinally.

Additionally, the contact surfaces on which the base plate and the transverse displacement element contact each other and the contact surfaces on which the transverse displacement element and the longitudinal displacement element contact each other are horizontally or vertically flat and these elements are not forced against each other. Therefore, the element has the propensity to rattle when the transverse displacement element is being displaced on the base plate or the longitudinal displacement element is being displaced on the transverse displacement element.

OBJECTS AND SUMMARY OF THE INVENTION

It is an object of the present invention to provide a mounting support device which accurately and firmly positions a mounting support between reference holes or reference slots on a fixture base (ie. a position in which no reference holes or reference slots exists) that overcomes the drawbacks of the prior art.

It is another object of this invention to provide a mounting support device that avoids rattling when the position of the mounting support is being moved in the longitudinal or transverse direction.

It is another object of this invention to provide a mounting support device that can be re-mounted readily at its exact former mounting support position after being removed from the fixture base.

Briefly, a mounting support device allows workpieces to be attached at points intermediate between the discrete positions of fixture bases of machine tools. The mounting support device has three support members. A lower support member is slidably attached to an intermediate member allowing the intermediate member to move along an x-axis. An upper support member is slidably attached to the intermediate member allowing the upper member to move along a z-axis. A jig for holding a workpiece is connected to the upper member. The lower support member is attached to the fixture base in a discrete location in the usual way. Thus, the jig holding the workpiece can be positioned intermediately between discrete mounting positions of the fixture base. The sliding attachments maintain precise alignment between the support members and can be secured after adjustment.

According to an embodiment of the present invention, there is described, a mounting support device for securing a jig to a fixture base, the fixture base having means for attaching a member in discrete locations on the fixture base, comprising: a first support member attachable to the fixture base in one of the discrete locations, a second support member, means for movably mounting the second support member on the first support member, an alignment surface of one of the first support member and the second support member, an alignment member of another of the first support member and the second support member, means for urging the alignment member against the alignment surface, whereby the second alignment member is movably aligned with respect to the first alignment member, the second support member having means for holding the jig thereto, and means for securing a first selected position of the second support member with respect to the first support member.

According to another embodiment of the present invention, there is described, a mounting support device for securing a jig to a fixture base, the fixture base having means for attaching a member in discrete locations on the fixture base, comprising: a first support member attachable to the fixture base in one of the discrete locations, a second support member, first means for movably mounting the second support member on the first support member, a third support member, second means for movably mounting the third support member on the second support member, a first alignment surface of one of the first support member and the second support member, a first alignment member of another of the first support member and the second support member, means for urging the first alignment member against the first alignment surface, whereby the first alignment member is movably aligned with respect to the first alignment surface, a second alignment surface of one of the second support member and the third support member, a second alignment member of another of the second support member and the third support member, means for urging the second alignment member against the second alignment surface, whereby the second alignment member is movably aligned with respect to the second alignment surface, the third support member having means for holding the jig thereto, first means for securing a first selected position of the second support member with respect to the first support member and second means for securing a second selected position of the third support member with respect to the second support member.

According to still another embodiment of the present invention, there is described, a mounting support device for securing a jig to a fixture base, the fixture base having means for attaching a member in discrete locations on the fixture base, comprising: a first support member, a second support member, a third support member, means for attaching the first support member in one of the discrete locations on the fixture base, first means for slidably mounting the second support member on the first support member so that the second support member slides along an x-axis, the x-axis being in fixed relation to the first support member, second means for slidably mounting the third support member on the second support member, so that the third support member slides along a z-axis, the z-axis being substantially perpendicular to the x-axis, first securing means for selectively fixedly securing the second support member to the first support member, second securing means for selectively fixedly securing the third support member to the second support member, a first securing by the first securing means being independent of a second securing by the second securing means, whereby the first support member is slidable with respect to the second support member when the second support member is fixedly secured to the third support member, the first securing being independent of the second securing, whereby the third support member is slidable with respect to the second support member when the second support member is fixedly secured to the first support member and means for fixing the jig to the third support member, the jig holding a workpiece.

To achieve the objects of the invention, the mounting support device of the present invention includes a first support member adapted to be fastened to a fixture base using a reference hole or reference slot, a second support member adapted to be mounted and fastened on the first support member so that it can slide relative to the first support member, and a third support member adapted to be mounted on the second support member so that it can slide substantially perpendicular to the sliding direction of the second support member and can be fastened to the second support member. A jig or mounting support, such as a tightening member, a fixing member, or a positioning member, can be fixed to the third support member.

First guide channels are provided on two sides of the first support member. Second slide guide members are provided for engaging with the first guide channels to allow the second support member to slide. Preferably, at least one of the second slide guide members is urged against the first guide channels.

The second support member includes second guide channels on at least one side. The third support member is provided with third slide guide members for engaging with the second guide channels to allow the third support member to slide. Preferably, at least one of the third slide guide members is urged against the second guide channel.

Preferably, the second support member has a second slide guide set screw hole. A second slide guide set screw can be screwed into the second slide guide set screw hole to force and fasten the second slide guide member against the first guide channel of the first support member.

Preferably, the third support member has a third slide guide set screw hole. A third slide guide set screw can be screwed into the third slide guide set screw hole to force and fasten at least one of the third slide guide members against the corresponding second guide channel of the second support member.

It is preferable that the first guide channel is V-shaped and that the second slide guide member has a sharp edge so as to engage with the V-shaped first guide channel. Therefore, the edge portion of the second slide guide member can be forced firmly against the first guide channel such that the second support member is securely fastened to the first support member.

The second guide channel is V-shaped and the third slide guide member has a sharp edge so as to engage the V-shaped second guide channel. Therefore, the edge portion of the third slide guide member is firmly forced against the second guide channel such that the third support member is securely fastened to the second support member.

A second support portion for supporting the second slide guide member is provided in a lower portion of the second support member. A second support portion set screw is screwed into a second support portion set screw hole extending through the second support portion. The second support portion set screw leading end is fitted in the second slide guide channel portion on the bottom surface of the second slide guide member.

A third support portion for supporting the third slide guide member is located on a lower portion of the third support member. A third support portion set screw is screwed into a third support portion set screw hole extending through the third support portion. The third support portion set screw leading end is fitted in the third slide guide channel portion on the bottom surface of the third slide guide member.

A second spring hole on one of the sides of the second support member contains a second spring plunger for urging the second slide guide member against the first guide channel of the first support member.

A third spring hole on one of the sides of the third support member contains a third spring plunger for urging the third slide guide member against the second guide channel of the second support member.

A first scale on the surface of the first support member is marked at predetermined increments. A second scale on the surface of the second support member is also marked at predetermined increments. The increments of the first scale guide positioning of the second support member along the first support member. Similarly, the increments of the second scale guide positioning of the third support member along the second support member.

The mounting support device is assembled in the following manner. First, the first support member is fixed to the fixture base using the reference hole or reference channel. Then, the second support member is slid along the first support member to a desired position and fixed thereto. Then, the third support member is fixed in a desired position relative to the second support member, the position having been reached by sliding the third support member in a direction generally perpendicular to the direction of the sliding of the second support member. A jig or mounting support is fixed to the third support member. As a result, the jig or mounting support can be mounted at any desired position, even where a reference hole or reference channel is omitted.

Therefore, a jig or mounting support, such as a tightening member, a fixing member, or a positioning member, can be fixed in a position in which no reference hole or reference channel exists. This is accomplished easily, accurately and without relying on the judgement of the user. If the amounts by which the second and third support members are moved for position adjustment are recorded or remembered, the jig or the mounting support can be repeatedly returned to the same location accurately and securely by following that record.

Because at least one of the second slide guide members is urged to fit into the corresponding first guide channel of the first support member, rattling of the first guide channel against the second slide guide member is prevented. Therefore, the second support member can be slid smoothly on the first support member facilitating easy and precise positioning.

Because at least one of the third slide guide members is urged to fit into the second guide channel of the second support member, rattling of the second guide channel against the third slide guide member is prevented. Therefore, the third support member can be slid smoothly on the second support member facilitating easy and precise positioning.

The second slide guide set screw presses at least one of the second slide guide members against the corresponding first guide channel of the first support member when screwed into the second slide guide set screw hole. This fastens the second support member securely to the first support member, thus avoiding slippage during operation.

The third slide guide set screw member presses at least one of the third slide guide members against the corresponding second guide channel of the second support member when screwed into the third slide guide set screw hole, so that the third support member is securely fastened to the second support member, thereby avoiding slippage during operation.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 is an enlarged front view of a second support member of this embodiment.

FIG. 6 is a sectional view taken along the line I—I of FIG. 5.

DETAILED DESCRIPTION OF THE PREFERRED EMBODIMENT

Figure 15:
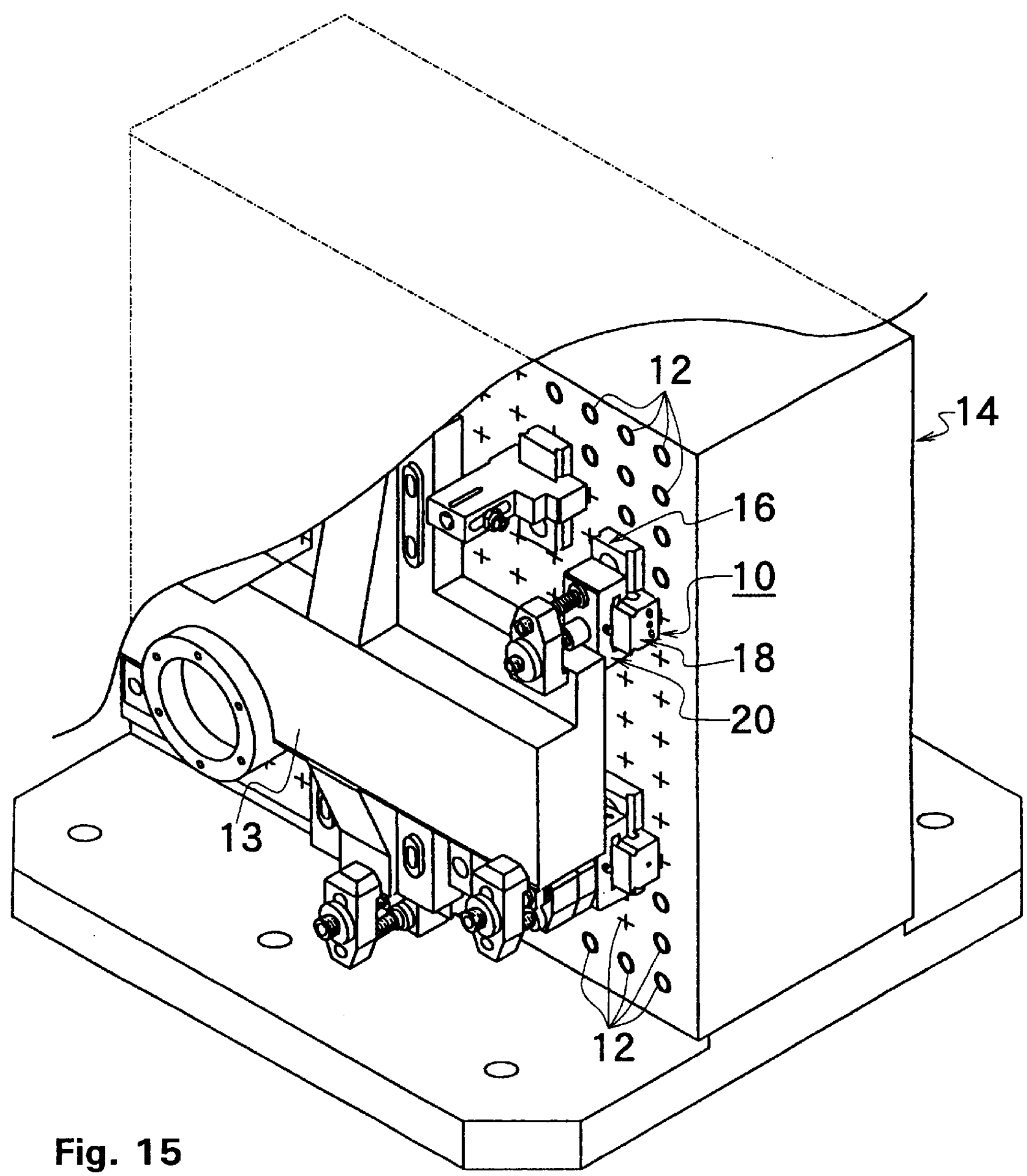
FIG. 15 is a perspective view of a workpiece mounted on a fixture base using the mounting support devices of this embodiment.

Referring to FIG. 15, a mounting support device 10 is bolted to a fixture base 14 using one or more bolts (not shown) engaging reference holes 12, 12. Reference holes 12, 12 of fixture base 14 are arranged in an X-Z array longitudinally and laterally at a pitch of 50 mm.

Figure 17:
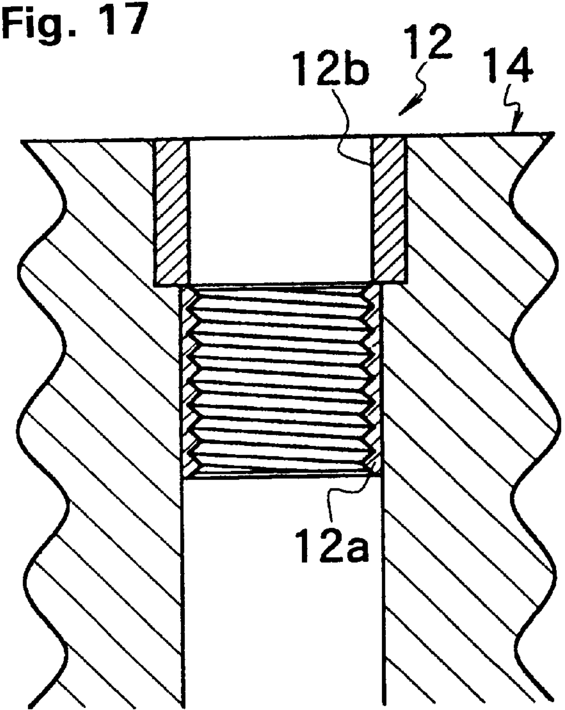
FIG. 17 is an enlarged sectional view of a reference hole in a fixture base.

Referring now to FIG. 17, each reference hole 12 contains a threaded reference screw hole 12*a*. A reference bushing 12*b* is installed in a counterbored portion of reference hole 12 outward of reference screw hole 12*a*. A threaded portion of a reference hole screw 15 (not shown in FIG. 12) engages reference screw hole 12*a*.

Figure 2:
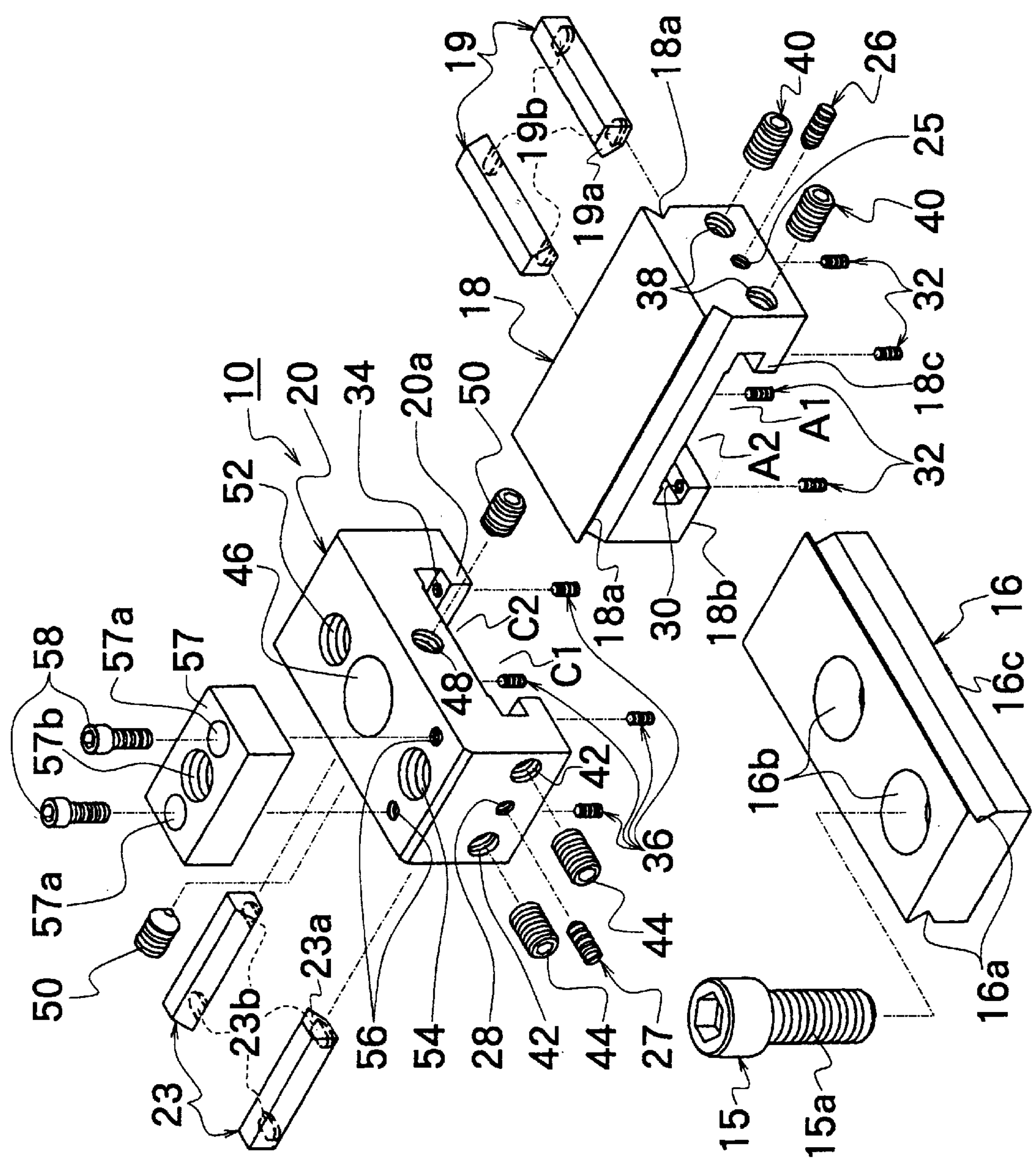
FIG. 2 is an exploded perspective view the embodiment shown in FIG. 1.

Returning now to FIG. 15 and also to FIG. 2, mounting support device 10 is bolted to fixture base 14 by tightening reference hole screw 15 (see FIG. 2) into a desired reference hole 12. Reference hole screw 15 may be of any convenient type of fastener such as, for example, a hexagon socket head cap screw. A workpiece 13 is mounted on fixture base 14 supported by one or more mounting support devices 10, four of which are shown in FIG. 15.

Fixture base 14 illustrated and described above is a two-sided base having two mounting surfaces. Fixture base 14 is not limited to a two-sided base. Instead, fixture base 14 has any desired shape such as, for example, it may be a four-sided block having four mounting surfaces, or a base plate BP1 having a single mounting surface such as shown in FIG. 19.

The reference holes 12 of fixture base 14 may be equidistant from each other in X and Z directions, or the spacing in the X direction may be S different from the spacing in the Z direction. In addition, the spacing is not necessarily uniform in either direction. Also, a grid design is not the only pattern of reference holes. Any pattern is satisfactory as long as mounting support device 10 can be mounted where necessary on fixture base 14. Ordinary mounting holes, such as screw holes, without high precision can be substituted for reference holes 12 without departing from the spirit and scope of the invention.

Figure 19:
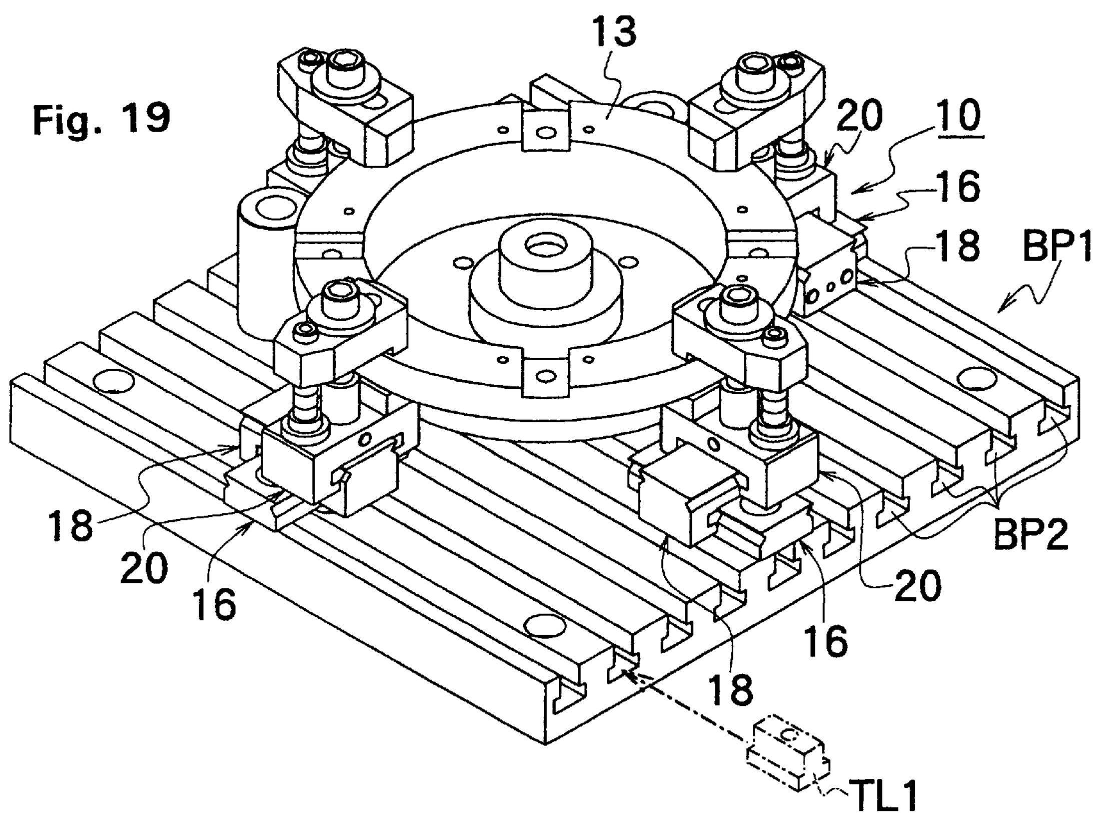
FIG. 19 is a perspective view in which a mounting support device is fixed to a base plate having mounting channels and then a workpiece is mounted using mounting support devices according to the embodiment.

Referring now to FIG. 19, a further embodiment, substitutes a fixture base 14 having reference slots BP2, BP2 instead of reference holes 12 of the prior embodiment. In this case, a T-slot nut TL1 is engaged in a desired reference slot BP2, and slid along to any desired position. T-slot nut TL1 is fixed in place by fitting a male screw member (not shown) through a first support member 16 and into a threaded portion of T-slot nut TL1. Tightening the male screw member into T-slot nut TL1 fixes first support member 16 anywhere desired along reference slot BP2 on base plate BP1. Additional adjustments of the position of mounting support device 10 in X and Z directions is performed as will be described.

As described above, precision reference slot BP2 are engaged by T-slot nuts TL1. However, the present invention does not rely on such precision reference slots. Instead, an ordinary T-shaped slot with low or medium precision can also be substituted for reference slot BP2.

Figure 1:
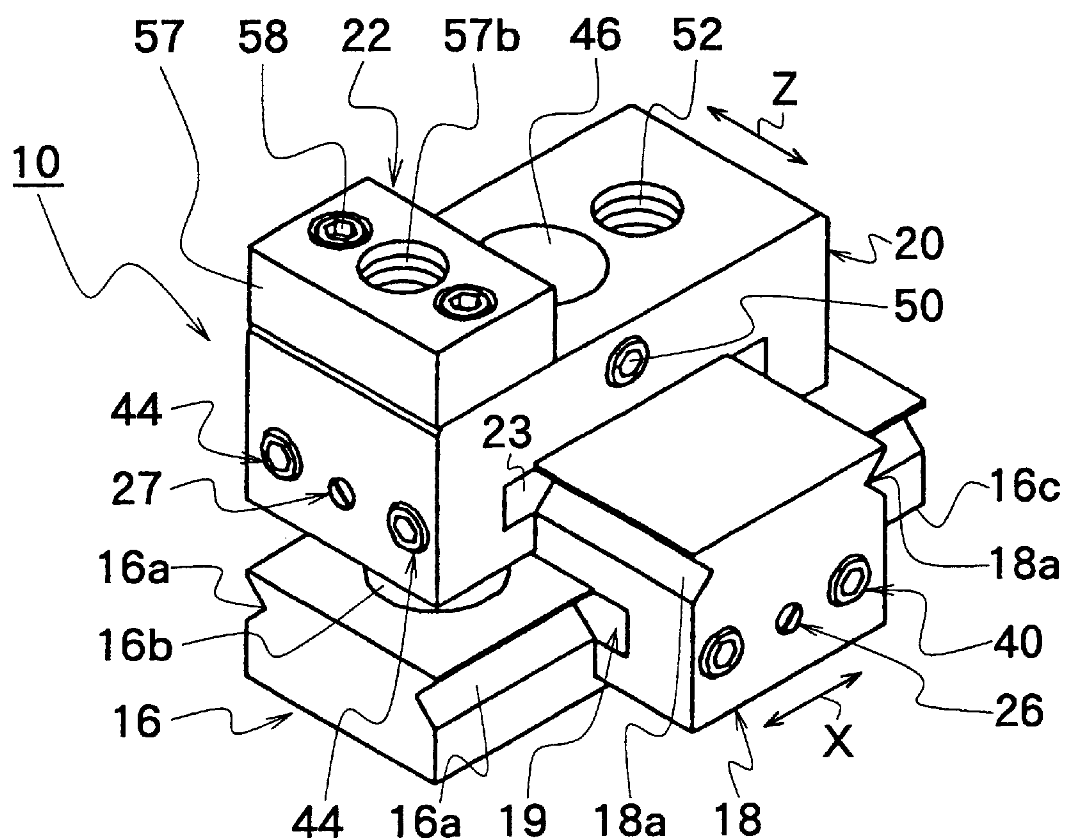
FIG. 1 is a perspective view of an embodiment of a mounting support device according to the present invention.
Figure 3:
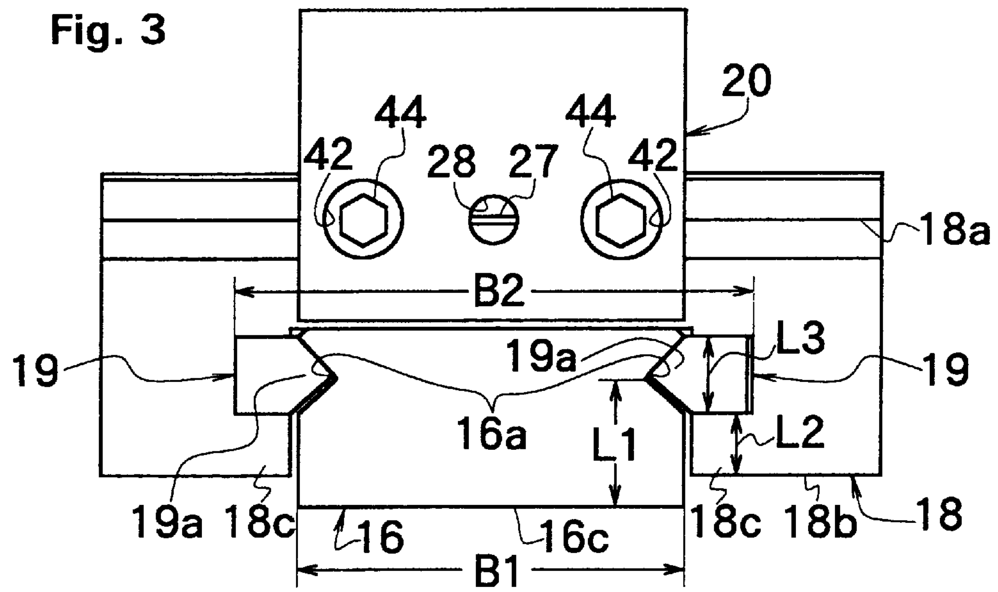
FIG. 3 is an enlarged front view of the mounting support device of this embodiment from which a height adjusting member is removed.

Referring now to FIGS. 1, 2 and 3, mounting support device 10 includes a first support member 16. First support member 16 includes two mounting holes 16*b*, 16*b* extending upwardly through it from a first bottom surface 16*c*. First support member 16 also includes two first guide channels 16*a* and 16*a* having V-shaped cross sections at a first guide channel height L1 above first bottom surface 16*c*.

First support member 16 is fixed to fixture base 14 (not shown in FIGS. 1, 2 or 3) by one or more reference hole screws 15, optionally hexagonal socket head cap screws, placed through at least one mounting hole 16*b*, engaged and tightened into respective reference holes 12 (not shown in FIGS. 1, 2 or 3), or into T-nuts in reference slots BP2 (T-nuts and reference slots BP2 are not shown in FIGS. 1, 2 or 3).

Figure 4:
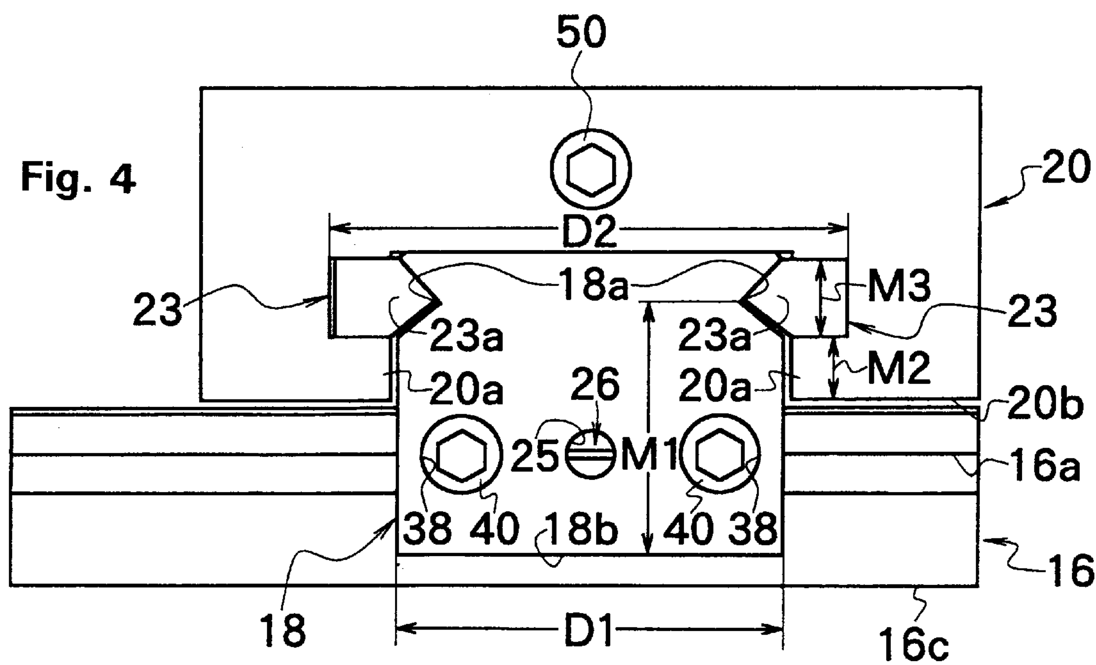
FIG. 4 is an enlarged side view the arrangement shown in FIG. 3.

Referring now also to FIG. 4, mounting support device 10 also includes a second support member 18 with a second bottom surface 18*b*. Second support member 18 includes second guide channels 18*a*, 18*a* having V-shaped cross sections at a second guide channel height M1 above second bottom surface 18*b*.

Second support member 18 also includes two second support portions 18*c*, 18*c* extending toward each other parallel to second bottom surface 18*b*, on opposing sides of second support member 18. Second support portions 18*c* and 18*c* run substantially perpendicular to second guide channels 18*a* and 18*a*. A second support member lower space A1 is defined by the area between second support portions 18*c* and 18*c* from second bottom surface 18*b* to a second support portion height L2. Second support member upper space A2 is defined by the area between second support portions 18*c*, 18*c* from second slide guide height L2 to a second support portion height L3. The width of first bottom surface 16*c* is equal to a distance B1. Distance B1 is slightly less than a width of second support member lower space A1 between the facing tips of second support portions 18*c*, 18*c*. A width B2 is defined by the width of second support member upper space A2. It will be noted that width B2 is substantially greater than width B1, whereby the overhang of second support portions 18*c* is formed.

Two second slide guide members 19, 19 are fitted into second support member upper space A2. As best shown in FIG. 2, each second slide guide member 19 includes a second slide guide edge portion 19*a* having a V-shaped forward edge. First and second second slide guide channel portions 19*b* are located at opposite ends of a lower face of each second slide guide member 19. Second slide guide channel portions 19*b* run from the V-shaped portion of second slide guide member 19 in a direction generally perpendicular to second slide guide edge portion 19*a*. Second slide guide channel portions 19*b* run more than half way toward a rear extremity of second slide guide member 19, but at most, less than a full distance to a rear edge thereof. Second slide guide members 19, 19 are fitted into second support member upper space A2 above second support portions 18*c*, 18*c*. Second slide guide edge portions 19*a*, 19*a* face second support member upper space A2. Second slide guide channel portions 19*b* face downward.

Each second support portion 18*c* includes two second support portion set screw holes 30, communicating second bottom surface 18*b* to second support member upper space A2, corresponding to second slide guide channel portions 19*b*. Second support portion set screws 32 are engaged in second support portion set screw holes 30. Second support portion set screws 32 hold second slide guide members 19 in place by protruding into second slide guide channel portions 19*b*.

Referring momentarily to FIG. 6, second support member 18 also includes a second spring hole 25 which communicates second support member upper space A2 with the side of second support member 18. A second spring plunger 26 includes a second spring 26*a* and a second ball 26*b*. Second spring plunger 26 engages second spring hole 25. Second spring 26*a* urges second ball 26*b* toward second support member upper space A2.

Second support member 18 also includes two second slide guide set screw holes 38 on the same side of second support member 18 as second spring hole 25. Second spring hole 25 is located between second slide guide set screw holes 38. Second slide guide set screws 40 engage second slide guide set screw holes 38.

Second support member 18 is slid onto first support member 16 by engaging second slide guide edge portions 19*a*, 19*a* with first guide channels 16*a*. Second support member 18 is positioned to a desired location on first support member 16 along the x-axis. Second spring plunger 26 urges second slide guide member 19 against first guide channel 16*a* so that sliding is smooth and without rattling. Once second support member 18 is in the desired position, second slide guide set screws 40 are tightened against second slide guide members 19 to hold second slide guide members 19 against first guide channels 16*a*, thereby retaining second support member 18 firmly held in place relative to first support member 16.

First support member 16 has two mounting holes 16*b*, 16*b* extending through it. A reference hole screw 15, such as a hexagon socket head cap screw, is inserted through one of mounting holes 16*b* (or both if necessary) of first support member 16 and engages desired reference hole 12 of fixture base 14 (or a T-slot nut placed in a desired reference slot BP2). Reference hole screw portion 15*a* of reference hole screw 15 tightens reference hole screw hole 12*a* to fix first support member 16 to fixture base 14. Mounting holes 16*b* of first support member 16 may be elongated instead of circular to allow some adjustment of the position of first support member 16.

Referring to FIGS. 1 and 3, first support member 16 contains first guide channels 16*a*, 16*a* having V-shaped cross sections to allow second support member 18 to slide in the X direction. First guide channels 16*a*, 16*a* are formed at a first guide channel height L1 from first bottom surface 16*c*.

Second support member 18 includes a pair of second slide guide members 19, 19 each having a second slide guide edge portion 19*a* projecting sideways. Second slide guide edge portions 19*a* are engaged in first guide channels 16*a*, 16*a* allowing second support member 18 to slide. Second slide guide members 19, 19 are urged toward corresponding first guide channels 16*a*, 16*a* such that second slide guide edge portions 19*a* abut first guide channels 16*a*.

Referring to FIGS. 2, 3, 6 and 7, second support portions 18*c*, 18*c*, supporting second slide guide members 19, 19, are located on the lower portion of second support member 18. Second support member lower space A1 is defined by the area between second support portions 18*c*, 18*c*, from second bottom surface 18*b* to a second support portion height L2. Second support member lower space A1 has a width slightly greater than first support member width B1.

A second support member upper space A2 is defined above second support member lower space A1, between second support portions 18*c*, 18*c* from second support portion height L2 to a second slide guide height L3. Second support member upper space A2 has a second support member slide guide width B2 substantially greater than the opening width of second support member lower space A1. Second slide guide members 19, 19 are inserted into second support member upper space A2, so that two second slide guide members 19, 19 are respectively placed adjacent to second support portions 18*c*, 18*c*.

Referring to FIGS. 1, 3, 6, 7 and 9, second slide guide members 19, 19 engage first guide channels 16*a*, 16*a* of first support member 16 to permit adjustment of position of second support member 18 on first support member 16.

Referring to FIGS. 4–6, a second spring hole 25 on one side of second support member 18 receives second spring plunger 26 in second spring hole 25 for urging second slide guide member 19 against first guide channel 16*a*. Second spring plunger 26, includes a male screw portion at its outer end. A second ball 26*b* is held in resilient contact with a rear surface of second slide guide member 19 by a second spring 26*a* biased between second ball 26*b* and an inner end of second spring plunger 26. Second slide guide member 19 is therefore resiliently urged toward second support member upper space A2.

Instead of a single spring hole 25 containing a single second spring plunger 26, an embodiment of the invention is contemplated in which a pair of spring holes with corresponding spring plungers are employed. Such an embodiment should be considered to fall within the spirit and scope of the invention.

In addition to springs, the urging means of spring plunger 26 may be any convenient means for performing the urging function consistent with the scope of the invention. For example, an elastic member, leaf spring, or other resilient means may be substituted.

Because at least one of second slide guide members 19, 19 is urged to abut the mating one of first guide channels 16*a*, 16*a*, second support member 18 is enabled to slide smoothly along first support member 16 without permitting rattling to occur between first guide channels 16*a*, 16*a* and second slide guide members 19, 19.

Figure 8:
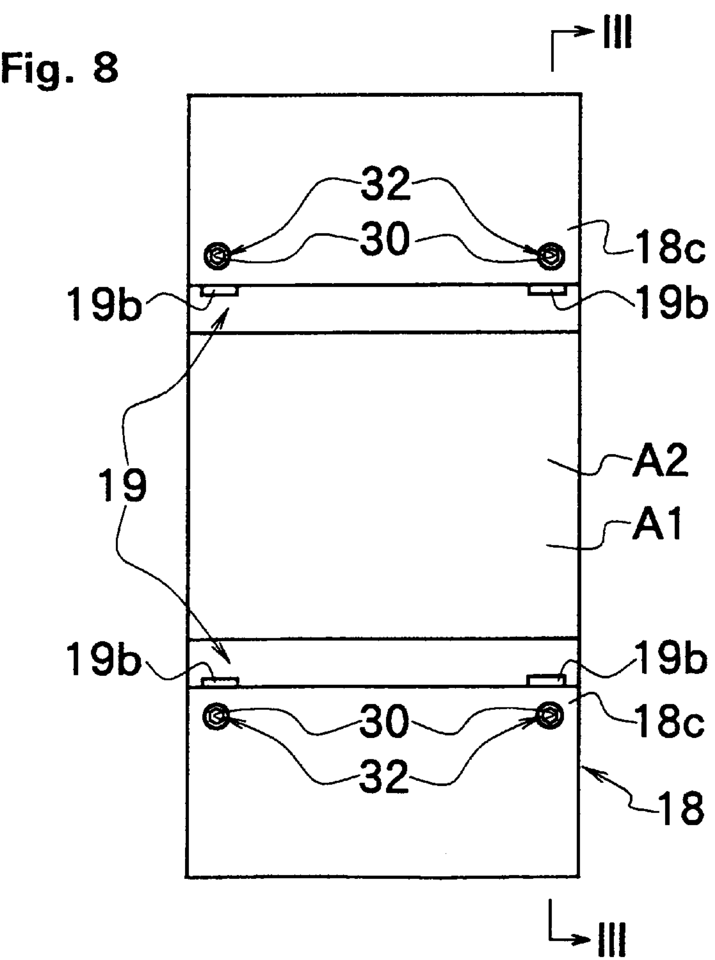
FIG. 8 is an enlarged bottom view of the second support member.
Figure 9:
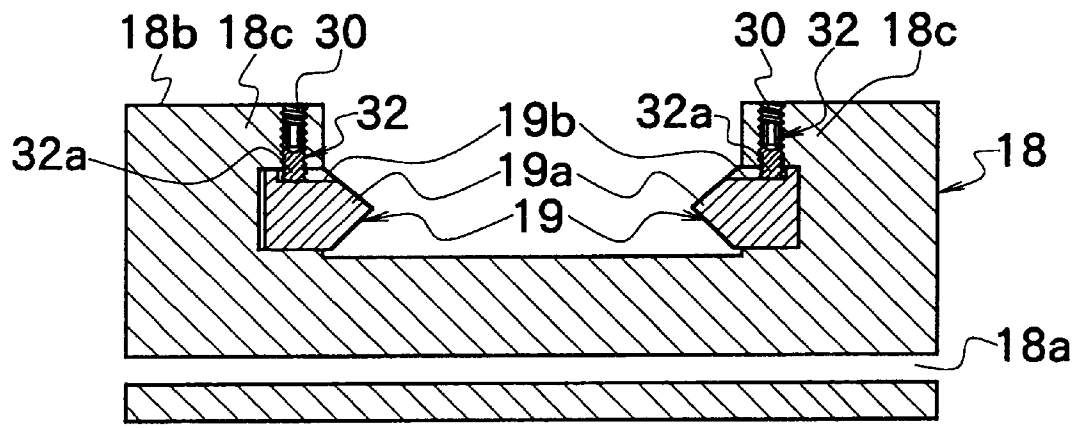
FIG. 9 is a sectional view taken along the line III—III of FIG. 8.

Referring to FIGS. 2, 8 and 9, the following structure insures that second slide guide edge portions 19*a*, 19*a* of two second slide guide members 19, 19 remain in uniform contact with first guide channels 16*a*, 16*a*.

Second support portion set screw holes 30 extend through second support portions 18*c*, 18*c* from second bottom surface 18*b*. Second support portion set screws 32, 32 are threaded into respective second support portion set screw holes 30, 30 until leading ends 32*a*, 32*a* abut second slide guide channel portions 19*b*, 19*b* to retain second slide guide member 19. Thus leading ends 32*a*, 32*a*, prevent slipping of second slide guide member 19 against a blind end of second support member upper space A2 and prevent second slide guide member 19 from sliding medially within second support member upper space A2. Second slide guide members 19, 19 are forced toward the corresponding first guide channel 16*a* by second spring plunger 26. The force of second spring 26*a* insures uniform contact between second slide guide edge portions 19*a*, 19*a* and first guide channels 16*a*, 16*a*.

Figure 7:
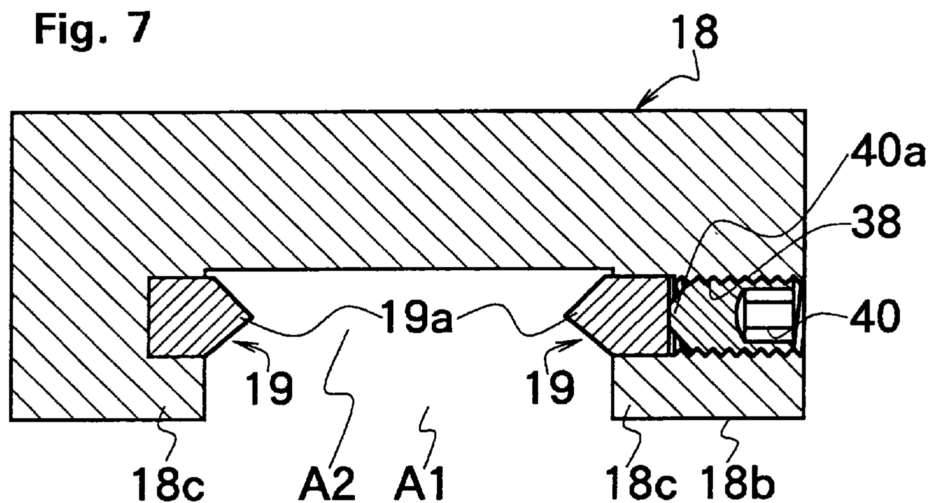
FIG. 7 is a sectional view taken along the line II—II of FIG. 5.

Referring to FIGS. 4, 5, and 7, second slide guide set screw holes 38, 38 run through second support member 18. Set screw holes 38, 38, on the same side of second support member 18 as second spring hole 25, join second support member upper space A2 and an end face of second support member 18. Second slide guide set screws 40, 40 thread into second slide guide set screw holes 38, 38 until second slide guide set screw leading ends 40*a*, 40*a* abut backs of second slide guide members 19. When second slide guide set screws 40, 40 are tightened, second slide guide set screw leading ends 40*a*, 40*a* force second slide guide members 19 against first guide channel 16*a* of first support member 16 when tightened, securely fastening second support member 18 to first support member 16.

Note, the means for fastening second support member 18 to first support member 16 is not restricted to the configuration of FIGS. 1–4. Other configurations are possible based on the present disclosure. For example, the use of second slide guide set screw 40 is not essential to the practice of the invention.

As shown in FIG. 4, second support member 18 contains second guide channels 18*a*, 18*a* with V-shaped cross sections that allow a third support member 20 to slide in the Z direction, generally perpendicular to the X direction. Second guide channels 18*a*, 18*a* run along second support member 18 at a second guide channel height M1 above second bottom surface 18*b*.

Referring to FIGS. 1–4, mounting support device 10 also includes a third support member 20 with a third bottom surface 20*b*. Third support member 20 includes two third support portions 20*a*, 20*a* extending toward each other parallel to third bottom surface 20*b*, on opposing sides of third support member 20.

A third support member lower space C1 is defined by the area between third support portions 20*a*, 20*a* from third bottom surface 20*b* to a third support portion height M2. A third support member upper space C2 is defined by the area between third support portions 20*a*, 20*a* from third support portion height M2 to a third slide guide height M3. The width of second bottom surface 18*b* is equal to a distance D1. Distance D1 is slightly less than a width of third support member lower space C1 between the facing tips of third support portions 20*a* and 20*a*. A width D2 is defined by the width of third support member upper space C2. It will be noted that the width D2 is substantially greater than width D1, whereby the overhang of second support portions 20*a* is formed.

Two third slide guide members 23, 23 are fitted into third support member upper space C2. As best shown on FIG. 2, each third slide guide member 23 includes a third slide guide edge portion 23*a*, having a V-shaped forward edge. First and second third slide guide channel portions 23*b* are disposed in a lower face of each third slide guide member 23. Third slide guide channel portions 23*b* run from the V-shaped portion of third slide guide member 23 in a direction generally perpendicular to third slide guide edge portion 23*a*. Third slide guide channel portions 23*b* run more than half way toward a rear extremity of third slide guide member 23, but at most, less than a full distance to the rear thereof. Third slide guide members 23 are fitted into third support member upper space C2 above third support portions 20*a*, 20*a*. Third slide guide edge portions 23*a*, 23*a* face third support member upper space C2. Third slide guide channel portions 23*b* face downward.

Each third support portion 20*a* includes two third support portion set screw holes 34, communicating third bottom surface 20*b* to third support member upper space C2, corresponding to third slide guide channel portions 23*b*. Third support portion set screws 36 are engaged in third support portion set screw holes 34. Third support portion set screws 36 hold third slide guide edge portions 23*a* in place by protruding into third slide guide channel portions 23*b*.

Figure 14:
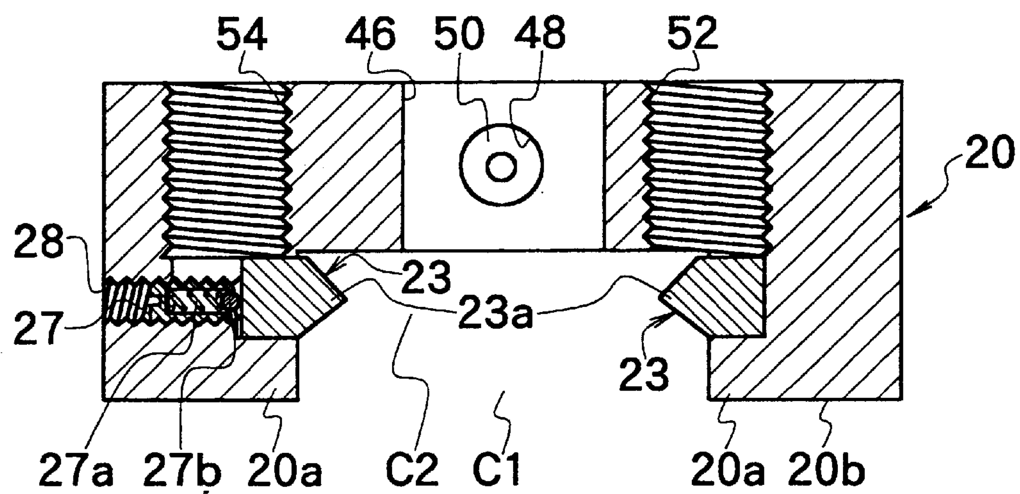
FIG. 14 is a sectional view taken along the line VI—VI of FIG. 11.

Referring momentarily to FIG. 14, third support portion 20*a* also includes a third spring hole 28 which communicates third support member upper space C2 with the outside of third support member 20. A third spring plunger 27 includes a third spring 27*a* and a third ball 27*b*. Third spring plunger 27 engages third spring hole 28. Third spring 27*a* urges third ball 27*b* toward third support member upper space C2.

Third support member 20 also includes two third slide guide set screw holes 42 on the same side of third support member 20 as third spring hole 28. Third spring hole 28 is located between third slide guide set screw holes 42. Third slide guide set screws 44 engage third slide guide set screw holes 42.

Third support member 20 is slid onto second support member 18 by engaging third slide guide edge portions 23*a*, 23*a* with second guide channels 18*a*. Third support member 20 is positioned to a desired location on second support member 18 along the z-axis. Third spring plunger 27 urges third slide guide member 23 against second guide channel 18*a* so that sliding is smooth and without rattling. Once third support member 20 is in the desired position, third slide guide set screws 44 are tightened against third slide guide members 23 to hold third slide guide members 23 against second guide channels 18*a*, thereby retaining third support member 20 firmly held in place relative to second support member 18.

Referring to FIGS. 1 and 4, third support member 20 includes a pair of third slide guide members 23, 23 each having a third slide guide edge portion 23*a*, projecting sideways. Third slide guide edge portions 23*a* engage second guide channels 18*a*, 18*a*, allowing third support member 20 to slide. Third slide guide members 23, 23 are urged toward corresponding second guide channels 18*a*, 18*a* such that third slide guide edge portions 23*a* abut second guide channels 18*a*.

Referring to FIGS. 2, 4, 13 and 14, third support portions 20*a*, 20*a*, supporting third slide guide members 23, 23, are located on the lower portion of third support member 20. Third support member lower space C1 is defined by the area between third support portions 20*a*, 20*a* from third bottom surface 20*b* to a third support portion height M2. Third support member lower space C1 has a width slightly greater than second support member width D1.

A third support member upper space C2 is defined above third support member lower space C1, between third support portions 20*a*, 20*a*, from third support portion height M2 to a third slide guide height M3. Third support member upper space C2 has a third support member slide guide width D2 substantially greater than the opening width of third support member lower space C1. Third slide guide members 23 are inserted into third support member upper space C2, so that two third slide guide members 23, 23 are respectively placed adjacent to third support portions 20*a* and 20*a*.

Referring to FIG. 1, 2, 13 and 14, third slide guide members 23, 23 engage second guide channels 18*a*, 18*a* to permit adjustment of position of third support member 20 on second support member 18.

Referring to FIGS. 3 and 14, a third spring hole 28 on one side of third support member 20 receives a third spring plunger 27 in third spring hole 28 for urging third slide guide member 23 against second guide channels 18*a*. Third spring plunger 27, includes a male screw portion on its outer end. A third ball 27*b* is held in resilient contact with a rear surface of third slide guide member 23 by a second spring 27*a* biased between third ball 27*b* and an inner end of third spring plunger 27. Third slide guide member 23 is therefore resiliently urged toward third support member upper space C2.

Instead of a single third spring hole 28 containing a single third spring plunger 27, an embodiment of the invention is contemplated in which a pair of spring holes with corresponding spring plungers is employed. Such an embodiment should be considered to fall within the spirit and scope of the invention.

In addition to springs, the urging means of third spring plunger 27 may be any convenient means for performing the urging function consistent with the scope of the invention. For example, an elastic member, leaf spring, or other resilient means may be substituted.

Because at least one of third slide guide members 23, 23 is urged to abut the mating one of second guide channels 18*a*, 18*a*, third support member 20 is enabled to slide smoothly along second support member 18 without permitting rattling to occur between second guide channels 18*a*, 18*a* and third slide guide members 23, 23.

Figure 10:
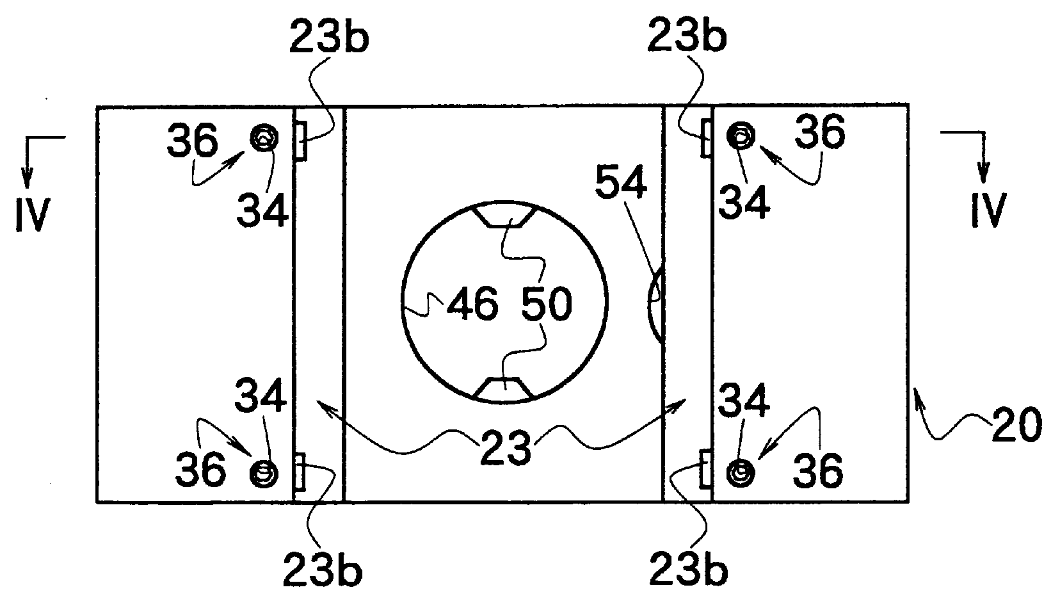
FIG. 10 is an enlarged bottom view of a third support member of the embodiment.
Figure 11:
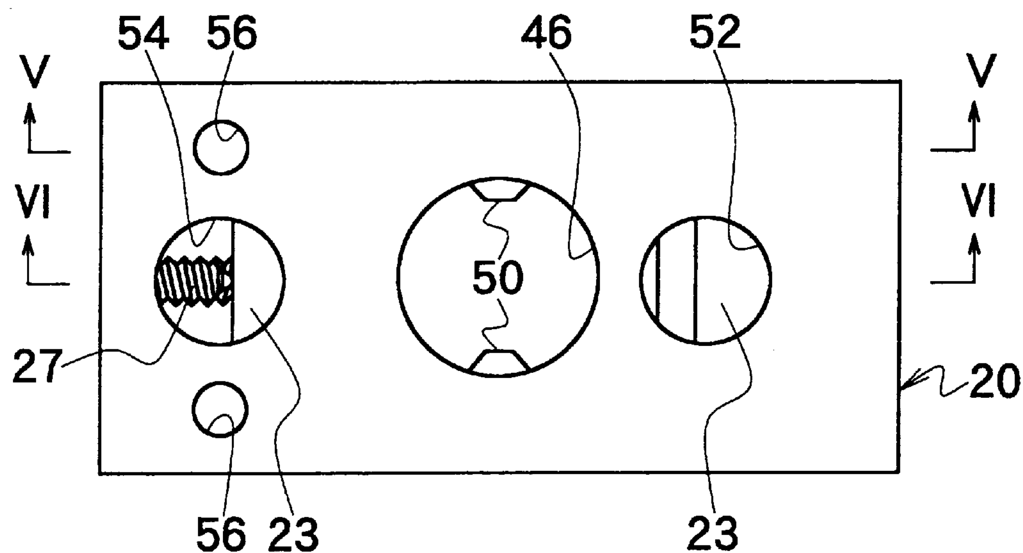
FIG. 11 is an enlarged front view of the third support member.
Figure 12:
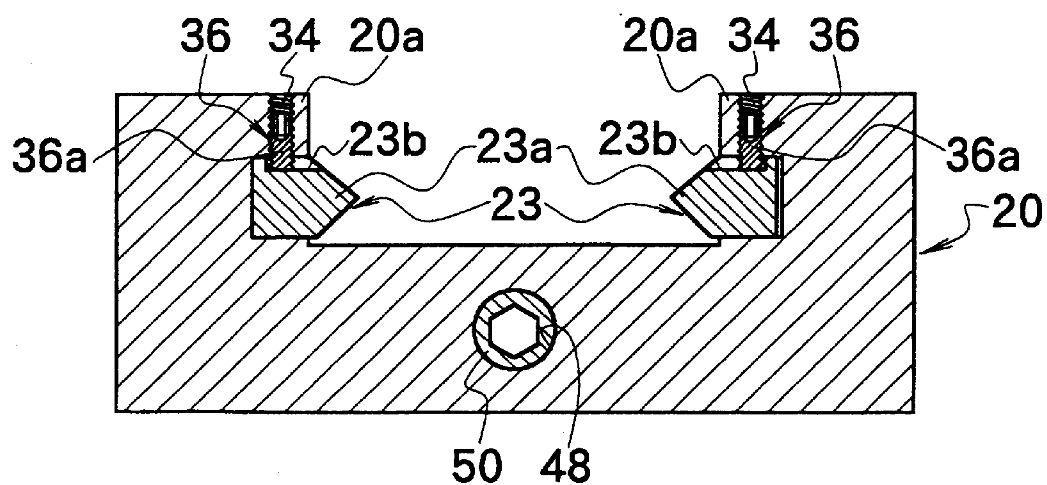
FIG. 12 is a sectional view taken along the line IV—IV of FIG. 10.

Referring to FIGS. 2, 10 and 12, the following structure insures that the third slide guide edge portions 23*a*, 23*a* remain in uniform contact with second guide channels 18*a*, 18*a*.

Third support portion set screw holes 34 extend through third support portions 20*a*, 20*a* from third bottom surface 20*b*. Third support portion set screws 36, 36 are threaded into respective third support portion set screw holes 34, 34 until third support portion set screw leading ends 36*a*, 36*a* abut third slide guide channel portions 23*b*, 23*b* to retain third slide guide member 23. Thus third support portion set screws leading ends 36*a*, 36*a*, prevent third slide guide member 23 from slipping against a blind end of third support member upper space C2 and from sliding medially within third support member upper space C2. Third slide guide members 23, 23 are forced toward the corresponding second guide channel 18*a* by third spring plunger 27. The force of third spring 27*a* insures uniform contact between third slide guide edge portions 23*a*, 23*a* and second guide channels 18*a*, 18*a*.

Figure 13:
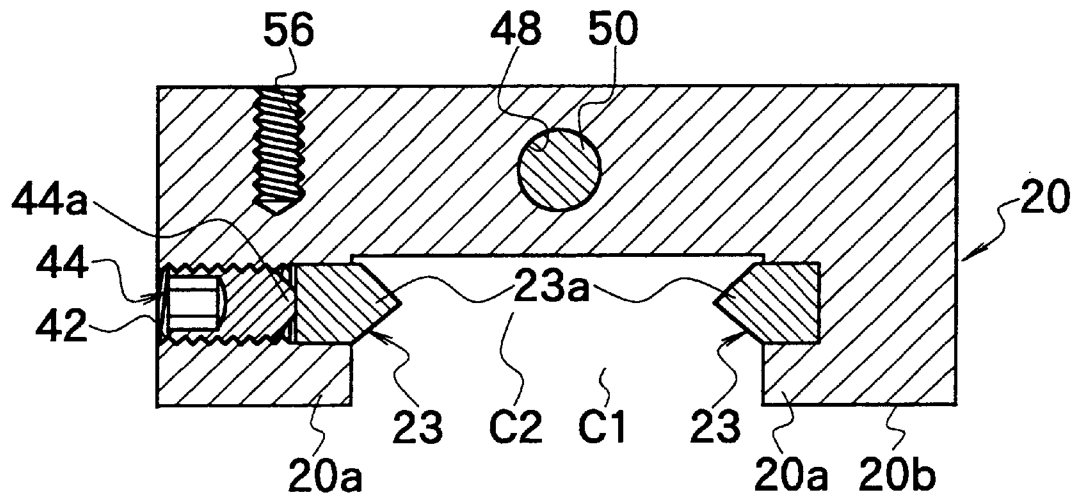
FIG. 13 is a sectional view taken along the line V—V of FIG. 11.

Referring to FIGS. 3 and 13, third slide guide set screw holes 42, 42 run through third support member 20. Third slide guide set screw holes 42, 42, on the same side of third support member 20 as third spring hole 28, join third support member upper space C2 and an ehd face of third support member 20. Third :slide guide set screws 44, 44 thread into third slide guide set screw holes 42, 42 until third slide guide set screw leading ends 44*a*, 44*a* abut the back of third slide guide members 23, 23. When third slide guide set screws 44, 44 are tightened, third slide guide set screw leading ends 44*a*, 44*a* force third slide guide member 23 against second guide channels 18*a*, 18*a*, securely fastening third support member 20 to second support member 18.

Note, the means for fastening third support member 20 to second support member 18 is not restricted to the configuration of FIGS. 1–4. Other configurations are possible based on the present disclosure. For example, the use of third slide guide set screw 44 is not essential to the practice of the invention.

Figure 16:
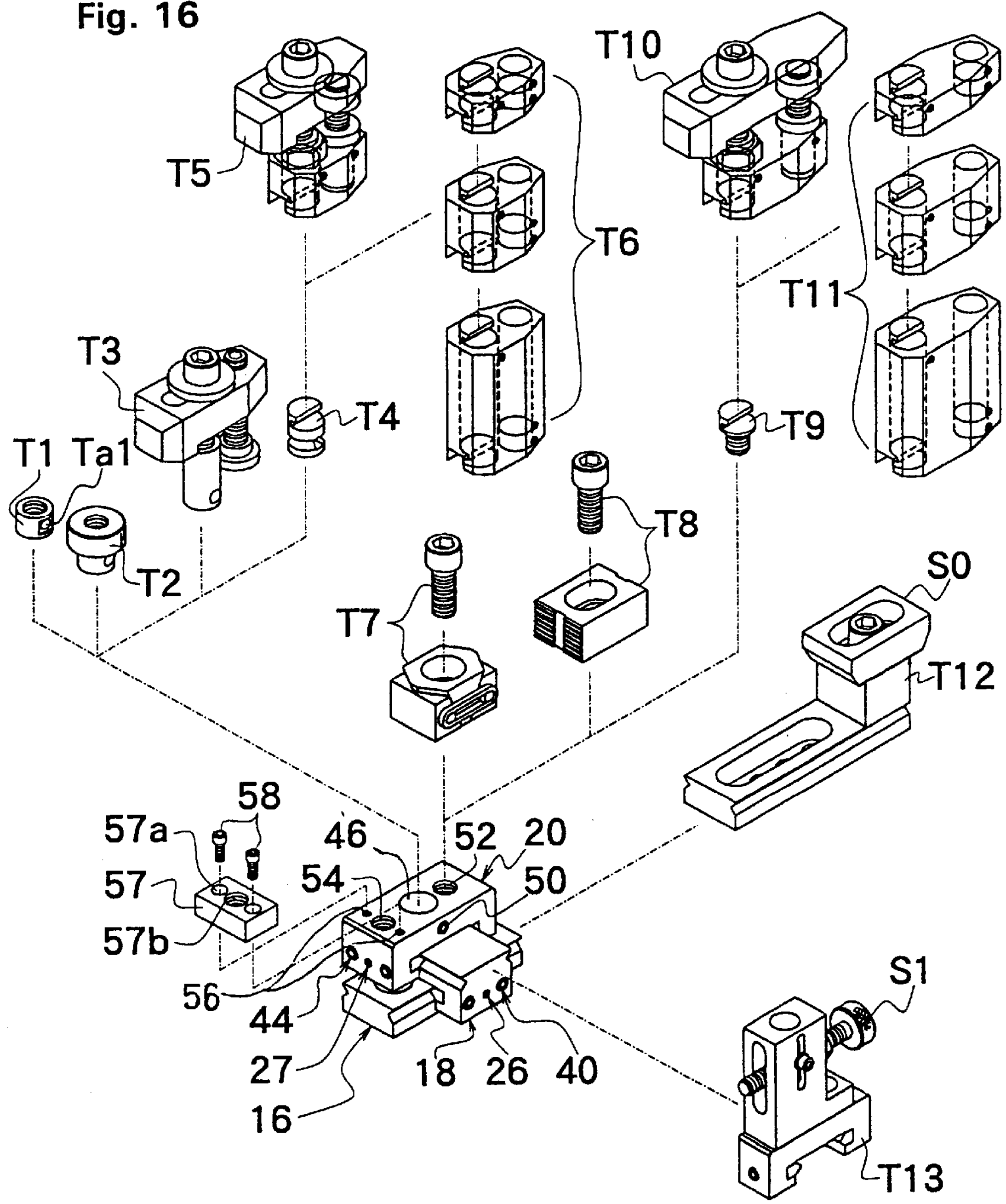
FIG. 16 illustrates how the mounting support device according to this embodiment is used.

Referring to FIG. 16, a large-diameter jig hole 46 extends vertically through a center of third support member 20. Large-diameter jig hole 46 receives a jig, for example, a screw T1, a locator T2, a first damper T3, or a second damper T5 by means of a mounting nut T4, or a second damper T5 by means of a height adjustment support member T6. The jig is any type of fixture that can be used to hold or position the workpiece on a base.

Referring to FIGS. 1, 2, 4 and 10, both sides of third support member 20 are pierced by jig holder screw holes 48, 48 thereby joining external sides of third support member 20 with large-diameter jig hole 46. A respective jig holder screw 50 threads into each of jig holder screw holes 48, 48 to fasten a jig in large-diameter jig hole 46. For example, if screw T1 is the jig to be fastened in large-diameter jig hole 46, a leading end of jig holder screw 50 engages a recess Ta1 on a side of screw T1 to fastened screw T1 within large-diameter jig hole 46.

Referring to FIG. 16, a first small-diameter jig hole 52 extends vertically through one side of third support member 20. First small-diameter jig hole 52 receives a jig or fixture, for example, a vise T7 with a mounting nut, a vise stopper T8 with a mounting nut, a third damper T10 by means of a mounting screw T9, or a third damper by T10 means of a height adjustment member T11.

A second small-diameter jig hole 54 extends vertically through third support member 20 on a side of large-diameter jig hole 46 opposite first small diameter jig hole 52. Second small-diameter jig hole 54 also receives a jig or fixture, for example, a vise T7 with amounting nut, a vise stopper T8 with a mounting nut, or a mounting screw member T9.

Referring now also to FIG. 2, third support member 20 also includes a pair of smaller-diameter height adjustment screw holes 56, 56 on either side of second small-diameter jig hole 54. A height adjustment member 57, with height adjustment through holes 57*a* extending vertically therethrough, is fixable to the top of third support member 20 by means of height adjustment screws 58, 58. Height adjustment screws 58, 58 insert through height adjustment through holes 57*a*, 57*a*, to thread into height adjustment screw holes 56, 56 to hold height adjustment member 57 in place. Height adjustment jig hole 57*b* extends vertically through height adjustment member 57, between height adjustment through holes 57*a*, 57*a*.

Although, in the embodiment, a tightening member such as a clamper, a fixing member such as a stopper, or a positioning member is attached to third support member 20, the present invention is not limited to this arrangement, thus various modifications are possible.

Next, a method of assembling mounting support device 10 according to the instant embodiment begins by setting first support member 16 at a predetermined position of fixture base 14. Next, a reference hole screw 15 is inserted through mounting hole 16*b* of first support member 16. By tightening reference hole screw 15 into reference screw hole 12*a*, first support member 16 is affixed to fixture base 14.

Second slide guide members 19, 19 are fitted into second support member upper space A2 above second support portions 18*c*, 18*c*. Second support portion set screws 32, 32 are tightened into second support portion set screw holes 30, 30 until second support portion set screw leading ends 32*a*, 32*a* protrude into second slide guide channel portions 19*b*, 19*b*.

Then, second spring plunger 26 is tightened into second spring hole 25 until second ball 26*b* abuts the back of second slide guide member 19. Second slide guide set screws 40, 40 engage second slide guide set screw holes 38, 38, on the same side of second support member 18 as second spring hole 25. Second slide guide set screws 40, 40 are then tightened to positions just short of the point where second slide guide set screw leading ends 40*a*, 40*a* contact the back of second slide guide member 19.

Third slide guide members 23, 23 are fitted into portions of third support member upper space C2 above third support portions 20*a*, 20*a*. Third support portion set screws 36, 36 are tightened into third support portion set screw holes 34, 34 until third support portion set screw leading ends 36*a*, 36*a* protrude into third slide guide channel portions 23*b*, 23*b*.

Third spring plunger 27 is tightened in third spring hole 28 until third ball 27*b* abuts the back of third slide guide member 23. Third slide guide set screws 44, 44 thread into third slide guide set screw holes 42, 42. Third slide guide set screws 44, 44 are tightened to positions just short of the point where second slide guide set screw leading ends 44*a*, 44*a* contact the back of second slide guide member 23.

First support member 16 is slidably connected in second support member lower and upper spaces A1 and A2. This connection is secured by mating second slide guide edge portion 19*a* of one of second slide guide members 19, 19 with one of first guide channels 16*a*, 16*a* and second slide guide edge portion 19*a* of the other of second slide guide members 19, 19 with the other of first guide channels 16*a*, 16*a*. Second support member 18 can be slid smoothly with respect to first support member 16 in the X direction. Second support member 18 can therefore be placed at any chosen position with respect to first support member 16.

Second slide guide set screws 40, 40 thread into second slide guide set screw holes 38, 38 and tightened until second slide guide set screw leading ends 40*a*, 40*a* abut the back of second slide guide member 19. Then second slide guide set screws 40, 40 are tightened into second slide guide set screw holes 38, 38 until second slide guide edge portion 19*a* firmly contacts first guide channel 16*a*. Thus, second support member 18 is firmly affixed to first support member 16.

Second support member 18 is slidably connected in third support member lower and upper spaces C1 and C2. This connection is secured by mating third slide guide edge portion 23*a* of one of third slide guide members 23, 23 with one of second guide channels 18*a*, 18*a* and third slide guide edge portion 23*a* of the other of third slide guide members 23, 23 with the other of second guide channels 18*a*, 18*a*. Third support member 20 can be slid smoothly with respect to second support member 18 in the Z direction. Thus third support member 20 can be placed at any desired position with respect to second support member 18.

Third slide guide set screws 44, 44, threaded into third slide guide set screw holes 42, 42, are tightened until third slide guide set screw leading ends 44*a*, 44*a* abut the back of third slide guide member 23. Then third slide guide set screws 44, 44 are further tightened into third slide guide set screw holes 42, 42 to firmly contact third slide guide edge portion 23*a* with second guide channel 18*a*. Thus, third support member 20 is firmly affixed to second support member 18.

With mounting support device 10 set in place, a jig or fixture is attached to third support member 20 using large-diameter jig hole 46, or first and second small-diameter jig holes 52 and 54 as described above. The jigs or fixtures are attached between reference holes 12 (or reference slots BP2), at a position in which no reference hole 12 (or reference slot BP2) exists.

Figure 18:
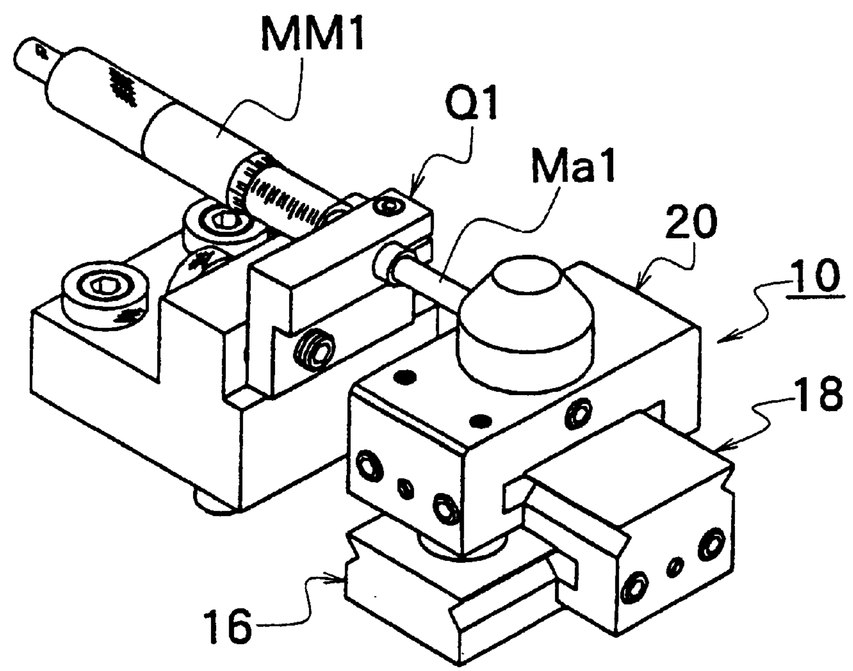
FIG. 18 is a perspective view in which the position of a mounting support device is adjusted and determined using a positioning adjustment device with a micrometer.
Figure 20:
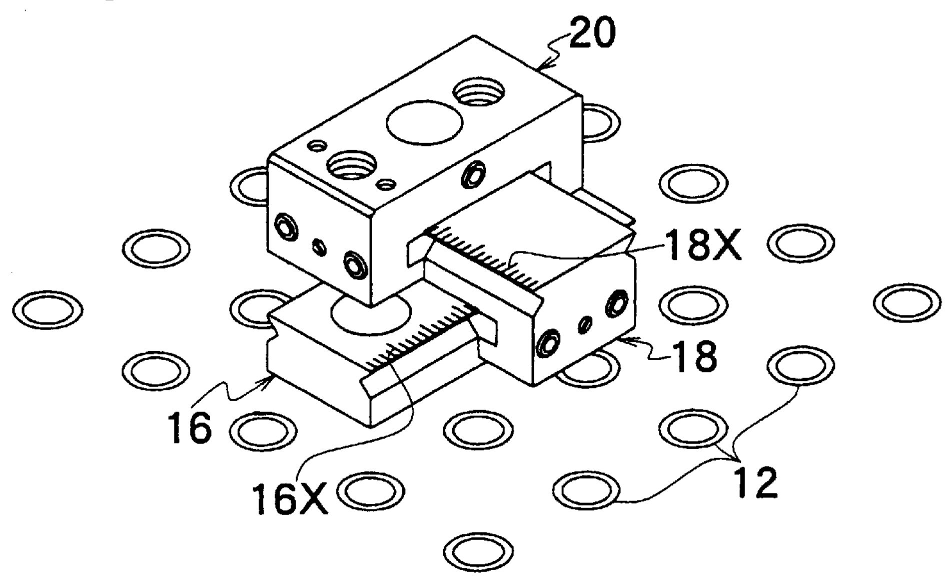
FIG. 20 is a perspective view of a mounting support device according to another embodiment.
Figure 21:
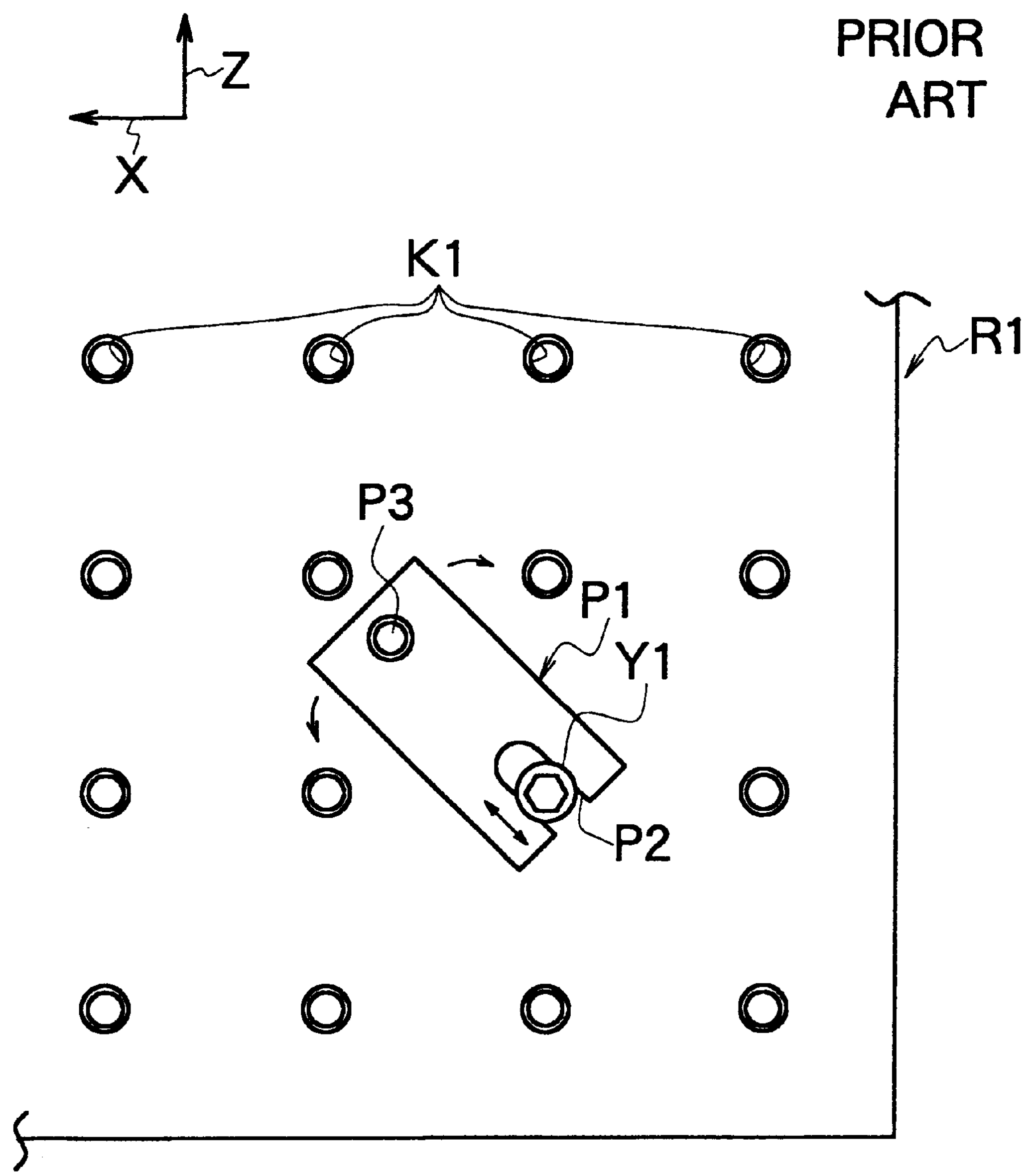
FIG. 21 illustrates a fixture arrangement according to the prior art.

Referring to FIG. 18, a positioning adjustment device Q1, with a micrometer MM1 attached by means of reference holes 12 (not shown in FIG. 18 but visible in FIG. 20). Micrometer MM1 is used to adjust a position of second support member 18 by sliding second support member 18 relative to first support member 16, or for adjusting the position of third support member 20 by sliding third support member 20 relative to second support member 18 (the latter adjustment is shown being made in FIG. 18). More specifically, after the amount of stroke of a spindle Ma1 of micrometer MM1 is adjusted and set, second support member 18 or third support member 20 is slid to a desired position. If the amount of sliding of the adjusted second or third support member is recorded as indicated by the stroke of spindle Ma1, it is possible to re-set the jig or fixture accurately and securely in a known position in accordance with the record of such position.

Using mounting support device 10, a jig may be attached to a position where no reference hole 12 is available for precise positioning.

Note also that it is not always necessary to perform high precision positioning using the aforementioned positioning adjustment device with micrometer MM1. It is useful to attach mounting support device 10, by a low precision positioning procedure as follows. Referring to FIG. 20, a first scale 16*x* consists of graduations (for example one millimeter graduations) embedded, marked, etched or bonded on a top or side of first support member 16. A user may position second support member 18 relative to first support member 16 by sliding it with respect to first support member 16 by referring to first scale 16*x* and securing second support member 18 to first support member 16. Similarly, a second scale 18*x* may be formed on the top or side of second support member 18. A user may position third support member 20 relative to second support member 18 by sliding it with respect to second support member 18 by referring to second scale 18*x* and securing third support member 20 to second support member 18.

The present invention is not limited to the above-described embodiment, but can be modified in various ways. Referring to FIG. 16, first support member 16 may be a member T12 having a stopper S0 which supports a vise T7 attached to third support member 20, from a back thereof. Third support member 20 may include stopper S1 to restrict movement of a workpiece 13. As for first and third support members, which form the mounting support devices of the present invention, the configuration or structure is not limited specifically.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A mounting support device for securing a jig to a fixture base, said fixture base having means for attaching a member in discrete locations on said fixture base, comprising:

a first support member attachable to said fixture base in one of said discrete locations;

a second support member;

means for slidably mounting said second support member on said first support member for sliding along an X-axis;

said means for slidably mounting including an alignment surface of one of said first support member and said second support member, said alignment surface being parallel to said X-axis; and an alignment member on a other of said first support member and said second support member;

a spring element for urging said alignment member against said alignment surface, said spring element including means for aligning said alignment member such that said alignment member is maintained aligned fixed with respect to said alignment surface whereby motion of the second support member is restricted to said X-axis;

said second support member having means for holding said jig thereto; and means for securing a selected position of said second support member with respect to said first support member at a selected location along the X-axis.

2. The mounting support device as in claim 1, wherein said means for securing a selected position comprises:

a set screw:

said a other of said first support member and said second support member including a threaded set screw hole;

said set screw being threadably inserted in said set screw hole; and said set screw hole being positioned in said a other of said first support member and said second support member such that said set screw further urges said alignment member against said alignment surface, whereby said selected position of said second support member is fixed relative to said first support member.

3. The mounting support device as in claim 1, further comprising means for determining said selected position of said second support member relative to said first support member, whereby said selected position can be recorded and said second support member returned to said selected position.

4. A mounting support device for securing a jig to a fixture base, said fixture base having means for attaching a member in discrete locations on said fixture base, comprising:

a first support member attachable to said fixture base in one of said discrete locations;

a second support member;

first means for mounting said second support member on said first support member for sliding along an X-axis;

a third support member;

second means for mounting said third support member on said second support member for sliding along a Z-axis which is perpendicular to said X-axis;

a first alignment surface of one of said first support member and said second support member, said first alignment surface being parallel to said X-axis;

a first alignment member of another of said first support member and said second support member;

a spring element for urging said first alignment member against said first alignment surface, said spring element including means for aligning said first alignment member such that said first alignment member is aligned with respect to said first alignment surface whereby motion of said second support member is restricted to sliding parallel to said X-axis;

a second alignment surface of one of said second support member and said third support member;

a second alignment member of another of said second support member and said third support member;

a spring member for urging said second alignment member against said second alignment surface, said spring element including means for aligning said second alignment member such that said second alignment member is aligned with respect to said second alignment surface;

said third support member having means for holding said jig thereto;

first means for securing a first selected position of said second support member with respect to said first support member; and second means for securing a second selected position of said third support member with respect to said second support member.

5. The device as in claim 4, wherein a first securing by said first means for securing is independent of a second securing by said second means for securing whereby said first support member is movable with respect to said second support member when said second support member is secured to said third support member by said second means for securing.

6. The device as in claim 5, wherein said first securing is independent of said second securing, whereby said third support member is movable with respect to said second support member when said second support member is secured to said first support member by said first means for securing.

7. The device as in claim 4, wherein a first securing by said first means for securing is independent of a second securing by said second means for securing whereby said third support member is movable with respect to said second support member when said second support member is secured to said first support member by said first means for securing.

8. The device as in claim 4, further including means for determining said first selected position of said second support member relative to said first support member and determining said second selected position of said third support member relative to said second support member, whereby said first selected position and said second selected position can be recorded and said second support member returned to said first selected position and said third support member returned to said second selected position.

9. A mounting support device for securing a jig to a fixture base, said fixture base having means for attaching a member in discrete locations on said fixture base, comprising:

a first support member;

a second support member;

means for attaching said first support member in one of said discrete locations on said fixture base;

means for slidably mounting said second support member on said first support member so that said second support member slides along an X-axis;

said X-axis being in fixed relation to said first support member;

securing means for selectively fixedly securing said second support member to said first support member;

means for fixing said jig to said second support member;

said means for slidably mounting including:

an alignment surface of one of said first support member and said second support member;

said alignment surface being parallel to said X-axis;

an alignment member of another of said first support member and said second support member;

said alignment member having means for aligning said alignment member with respect to said alignment surface when said alignment member is urged toward said alignment surface;

said alignment member being connected to said another of said first support member and said second support member so that said alignment member maintains a fixed alignment with said another of said first support member and said second support member; and means for urging said alignment member against said alignment surface, whereby motion of said second support member is restricted to sliding parallel to said X-axis.

* * * * *